United States Patent
Lee et al.

(10) Patent No.: US 12,449,485 B2
(45) Date of Patent: Oct. 21, 2025

(54) BATTERY MANAGEMENT APPARATUS AND METHOD

(71) Applicant: LG ENERGY SOLUTION, LTD., Seoul (KR)

(72) Inventors: Hyun Chul Lee, Daejeon (KR); Dong Keun Kwon, Daejeon (KR); Seung Hyun Kim, Daejeon (KR); An Soo Kim, Daejeon (KR); Chae Bin Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 325 days.

(21) Appl. No.: 17/911,936

(22) PCT Filed: Oct. 1, 2021

(86) PCT No.: PCT/KR2021/013537
§ 371 (c)(1),
(2) Date: Sep. 15, 2022

(87) PCT Pub. No.: WO2022/097931
PCT Pub. Date: May 12, 2022

(65) Prior Publication Data
US 2023/0148088 A1   May 11, 2023

(30) Foreign Application Priority Data

Nov. 5, 2020 (KR) .......................... 10-2020-0147136

(51) Int. Cl.
*G01R 31/387* (2019.01)
*G01R 31/392* (2019.01)
(Continued)

(52) U.S. Cl.
CPC ......... *G01R 31/396* (2019.01); *G01R 31/387* (2019.01); *G01R 31/392* (2019.01); *H02J 7/0014* (2013.01); *H02J 7/005* (2020.01)

(58) Field of Classification Search
CPC .. G01R 31/396; G01R 31/387; G01R 31/392; G01R 31/367; G01R 31/382;
(Continued)

(56) References Cited

U.S. PATENT DOCUMENTS

| 6,072,300 A | 6/2000 | Tsuji |
| 2010/0085009 A1 | 4/2010 | Kang et al. |

(Continued)

FOREIGN PATENT DOCUMENTS

| JP | H11-149944 A | 6/1999 |
| JP | 5395006 B2 | 1/2014 |

(Continued)

OTHER PUBLICATIONS

International Search Report (with partial translation) and Written Opinion dated Jan. 20, 2022, for corresponding International Patent Application No. PCT/KR2021/013537.

(Continued)

*Primary Examiner* — Tung S Lau
(74) *Attorney, Agent, or Firm* — Morgan, Lewis & Bockius LLP

(57) ABSTRACT

A battery management apparatus according to an embodiment of the present invention includes a state of health (SOH) calculating unit calculating an SOH of each of a plurality of battery cells and a balancing target determining unit selecting, as a second battery cell, a battery cell having a state of charge (SOC) difference from a first battery cell having a lowest SOC among the plurality of battery cells, the SOC difference being greater than or equal to a reference value, and determining a balancing target by comparing an (Continued)

SOH of the first battery cell with an SOH of the second battery cell.

14 Claims, 9 Drawing Sheets

(51) Int. Cl.
*G01R 31/396* (2019.01)
*H02J 7/00* (2006.01)

(58) Field of Classification Search
CPC ........ H02J 7/0014; H02J 7/005; H02J 7/0048; H02J 7/00712; H01M 2010/4271; H01M 10/425; H01M 10/441; H01M 2220/20; H01M 10/052; H01M 10/448; Y02E 60/10; Y02T 10/70
See application file for complete search history.

(56) References Cited

U.S. PATENT DOCUMENTS

| | | | |
|---|---|---|---|
| 2011/0078092 A1* | 3/2011 | Kim | B60L 53/305 |
| | | | 320/109 |
| 2013/0302657 A1 | 11/2013 | Itakura | |
| 2014/0217982 A1 | 8/2014 | Ohkawa et al. | |
| 2016/0099587 A1* | 4/2016 | Becker | H02J 7/0048 |
| | | | 320/136 |
| 2016/0218525 A1 | 7/2016 | Takao | |
| 2016/0336623 A1 | 11/2016 | Nayar et al. | |
| 2016/0336767 A1* | 11/2016 | Zane | H02J 7/0048 |
| 2019/0280488 A1 | 9/2019 | Tang et al. | |
| 2020/0235588 A1 | 7/2020 | Lee et al. | |
| 2020/0321787 A1 | 10/2020 | Miller | |
| 2021/0265671 A1 | 8/2021 | Chung | |
| 2022/0077508 A1 | 3/2022 | Nayar et al. | |

FOREIGN PATENT DOCUMENTS

| | | | |
|---|---|---|---|
| JP | 5561268 B2 | 7/2014 | |
| JP | 5609488 B2 | 10/2014 | |
| JP | 5831217 B2 | 12/2015 | |
| JP | 6102609 B2 | 3/2017 | |
| JP | 2018-057129 A | 4/2018 | |
| JP | 2019-165553 A | 9/2019 | |
| JP | 6680168 B2 | 4/2020 | |
| KR | 10-2012-0065293 A | 6/2012 | |
| KR | 10-2013-0071957 A | 7/2013 | |
| KR | 10-2015-0037406 A | 4/2015 | |
| KR | 10-2016-0043369 A | 4/2016 | |
| KR | 10-2016-0046221 A | 4/2016 | |
| KR | 10-2019-0011955 A | 2/2019 | |
| KR | 10-2019-0077070 A | 7/2019 | |
| KR | 10-2020-0044574 A | 4/2020 | |
| KR | 10-2020-0086960 A | 7/2020 | |
| WO | 2015/058165 A1 | 4/2015 | |
| WO | 2015/072061 A1 | 5/2015 | |
| WO | WO 2018199671 A1 * | 11/2018 | .......... H02J 7/00032 |
| WO | 2019/013077 A1 | 1/2019 | |
| WO | WO 2019161484 A1 * | 8/2019 | .............. H02J 7/345 |

OTHER PUBLICATIONS

Extended European Search Report (EESR) dated Aug. 7, 2023, issued in corresponding European Patent Application No. 21889396.4.

Office Action dated Sep. 4, 2023, issued in corresponding Japanese Patent Application No. 2022-553652.

Office Action issued on Apr. 19, 2025 in Chinese Patent Application No. 202180021065.2 (Note: US 2016/0099587 A1 and US 2011/0078092 A1 cited in this CN Office Action were cited in prior PTO-892s.).

* cited by examiner

BATTERY MANAGEMENT APPARATUS AND METHOD

TECHNICAL FIELD

Cross-Reference to Related Application

This application claims priority to and the benefit of Korean Patent Application No. 10-2020-0147136 filed in the Korean Intellectual Property Office on Nov. 5, 2020, the entire contents of which are incorporated herein by reference.

Technical Field

The present invention relates to a battery management apparatus and method, and more particularly, to a battery management apparatus and method in which whether to perform balancing for a battery cell may be determined based on an aging degree of the battery cell.

BACKGROUND ART

Recently, research and development of secondary batteries have been actively performed. Herein, the secondary batteries, which are chargeable/dischargeable batteries, may include all of conventional nickel (Ni)/cadmium (Cd) batteries, Ni/metal hydride (MH) batteries, etc., and recent lithium ion batteries. Among the secondary batteries, a lithium ion battery has a much higher energy density than those of the conventional Ni/Cd batteries, Ni/MH batteries, etc. Moreover, the lithium ion battery may be manufactured to be small and lightweight, such that the lithium ion battery has been used as a power source of mobile devices. In addition, the lithium ion battery is attracting attention as a next-generation energy storage medium as a usage range thereof is expanded to a power source of electric vehicles.

Furthermore, the secondary battery is generally used as a battery pack including a battery module where a plurality of battery cells are connected to one another in series and/or in parallel. The battery pack may be managed and controlled by a battery management system in terms of a state and an operation.

For an energy storage system (ESS) and an electric vehicle using a large-capacity battery including battery cells, multiple battery cells are mounted, such that balancing for the battery cell is a key issue. In particular, for an ESS including the large-capacity battery, some battery may be replaced and used through a warranty service.

However, in this case, indiscriminate balancing occurs regardless of an aging degree of a battery, failing to obtain a desired balancing effect and resulting in continuous discharging of the battery through balancing, causing degradation of the life of the battery.

DISCLOSURE

Technical Problem

The present invention provides a battery management apparatus and method in which when a balancing target of a battery cell is selected, whether to perform balancing is determined based on an aging degree of each battery cell, thereby efficiently performing balancing and safely managing a battery.

Technical problems of the present invention are not limited to the foregoing, and other unmentioned technical problems would be clearly understood by one of ordinary skill in the art from the following description.

Technical Solution

A battery management apparatus according to an embodiment of the present invention includes a state of health (SOH) calculating unit calculating an SOH of each of a plurality of battery cells and a balancing target determining unit selecting, as a second battery cell, a battery cell having a state of charge (SOC) difference from a first battery cell having a lowest SOC among the plurality of battery cells, the SOC difference being greater than or equal to a reference value, and determining a balancing target by comparing an SOH of the first battery cell with an SOH of the second battery cell.

The balancing target determining unit of the battery management apparatus according to an embodiment of the present invention may determine the second battery cell as the balancing target, when the SOH of the first battery cell is greater than or equal to the SOH of the second battery cell.

The battery management apparatus according to an embodiment of the present invention may further include a balancing control unit performing balancing for the battery cell determined as the balancing target.

The balancing control unit of the battery management apparatus according to an embodiment of the present invention may perform balancing when the SOC of the second battery cell is included in a preset section.

The balancing control unit of the battery management apparatus according to an embodiment of the present invention may perform balancing based on one of a first section in which the SOC of the second battery cell is greater than or equal to a first reference value and a second section in which the SOC of the battery cell is less than a second reference value that is less than the first reference value.

The battery management apparatus according to an embodiment of the present invention may further include a replacement target determining unit determining a replacement target battery cell based on an SOC deviation among the plurality of battery cells in other section than a section in which balancing for the battery cell is performed, between the first section and the second section.

The replacement target determining unit of the battery management apparatus according to an embodiment of the present invention may determine, as the replacement target battery cell, a battery cell having an SOC deviation from any cell among the plurality of battery cells, the SOC deviation being equal to or greater than a reference value.

The balancing control unit of the battery management apparatus according to an embodiment of the present invention may preferentially perform balancing for the first section, when balancing is possible both in the first section and in the second section.

In the battery management apparatus according to an embodiment of the present invention, the reference value may be set based on specifications of the battery cell and a battery management system (BMS) that manages the battery cell.

A battery management method according to an embodiment of the present invention includes calculating a state of health (SOH) of each of a plurality of battery cells, selecting, as a second battery cell, a battery cell with a state of charge (SOC) difference from a first battery cell with a lowest SOC among the plurality of battery cells, the SOC difference being greater than or equal to a reference value, and determining a balancing target by comparing an SOH of the first battery cell with an SOH of the second battery cell.

The determining of the balancing target in the battery management method according to an embodiment of the present invention may include determining the second battery cell as the balancing target, when the SOH of the first battery cell is greater than or equal to the SOH of the second battery cell.

Advantageous Effects

With a battery management apparatus and method according to the present invention, when a balancing target for a battery cell is selected, whether to perform balancing is determined based on an aging degree of each battery cell, thereby efficiently performing balancing and safely managing a battery.

MODES FOR INVENTION

Figure 1:
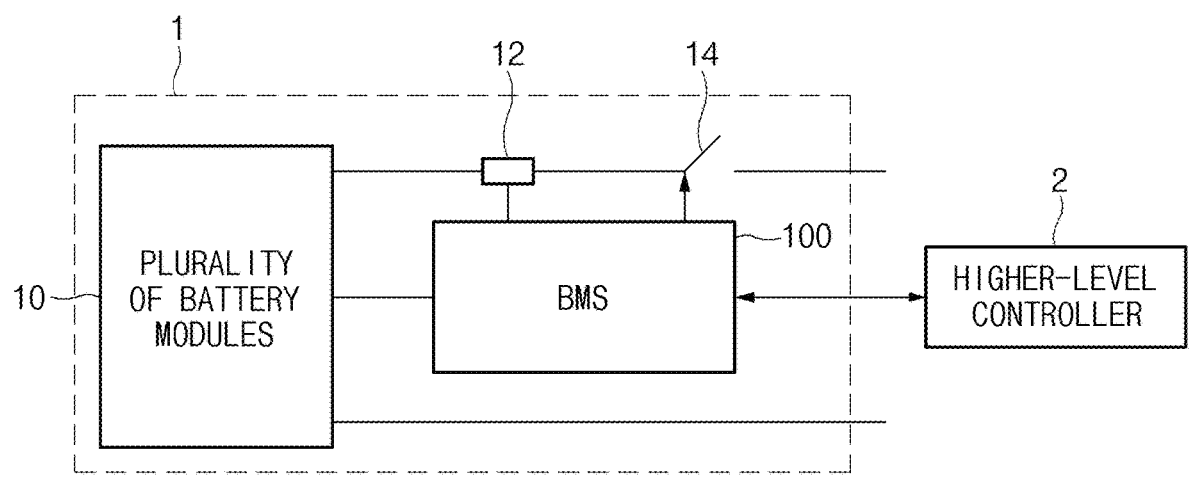
FIG. 1 is a block diagram of a general battery rack.

Hereinafter, various embodiments of the present invention will be described in detail with reference to the accompanying drawings. In this document, identical reference numerals will be used for identical components in the drawings, and the identical components will not be redundantly described.

For various embodiments of the present invention disclosed in this document, specific structural or functional descriptions are only exemplified for the purpose of describing the embodiments of the present invention, and various embodiments of the present invention may be implemented in various forms, and should not be construed as being limited to the embodiments described in this document.

As used in various embodiments, the terms "1st," "2nd," "first," "second," or the like may modify various components regardless of importance, and do not limit the components. For example, a first component may be named as a second component without departing from the right scope of the present invention, and similarly, the second component may be named as the first component.

Terms used in the present document are used for only describing a specific exemplary embodiment of the disclosure and may not have an intention to limit the scope of other exemplary embodiments of the disclosure. It is to be understood that the singular forms include plural references unless the context clearly dictates otherwise.

All terms including technical and scientific terms used herein have the same meaning as commonly understood by one of ordinary skill in the art to which the embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present invention.

FIG. 1 is a block diagram of a general battery rack.

Referring to FIG. 1, a battery control system including a battery rack 1 and a higher-level controller 2 included in a higher-level system according to an embodiment of the present invention is schematically shown.

As shown in FIG. 1, the battery rack 1 may include a plurality of battery modules 10 that include one or more battery cells and is chargeable/dischargeable, a switching unit 14 serially connected to a positive (+) terminal side or a negative (−) terminal side of the plurality of battery modules 10 to control a charging/discharging current flow of the battery module 10, a battery protection unit (not shown) that performs current blocking, charging/discharging mode transition, etc., for protection of the battery rack 1, a battery management system (e.g., RBMS) 100 for control and management to prevent over-charging and over-discharging by monitoring voltage, current, temperature, etc., of the battery rack 1. The battery rack 1 may include the battery module 10, a sensor 12, a switching unit 14, and the BMS 100.

Herein, as the switching unit 14 which is an element for controlling a current flow for charging or discharging of the plurality of battery modules 10, for example, at least one relay, magnetic contactor, etc., may be used according to specifications of the battery rack 1.

The battery protection unit (not shown) may include a relay, a fuse, etc., and control on/off of the relay according to a control signal of the BMS 100 to perform protection of the battery rack 1. The battery protection unit may also melt the fuse upon occurrence of an abnormal current or an abnormal voltage to block a current applied to the battery rack 1.

The BMS 100, which is an interface for receiving measurement values of the above-described various parameter values, may include a plurality of terminals and a circuit, etc., connected thereto to process input values. The BMS 100 may control on/off of the switching unit 14, e.g., a relay, a contactor, etc., and may be connected to the battery module 10 to monitor the state of each battery module 10.

The higher-level controller 2 may transmit a control signal regarding the battery module 10 to the BMS 100. Thus, the BMS 100 may also be controlled in terms of an operation thereof based on a signal applied from the higher-level controller 2. Meanwhile, the battery cell according to the present invention may be included in the battery module 10 used for an energy storage system (ESS). In this case, the higher-level controller 2 may be a controller (BBMS) of a battery bank including a plurality of racks or an ESS controller for controlling the entire ESS including a plurality of banks. However, the battery rack 1 is not limited to such a purpose.

In particular, as the BMS 100 includes a battery management apparatus to be described later, a target for battery cell balancing may be selected in consideration of the aging degree of each battery cell. That is, the BMS 100 of FIG. 1 may perform functions of a state of health (SOH) calculating unit 110, a balancing target determining unit 120, a balancing control unit 130, and a replacement target determining unit 140 of FIG. 2.

Such configurations of the battery rack 1 and the battery management system 100 are well-known configurations, and thus will not be described in detail.

Figure 2:
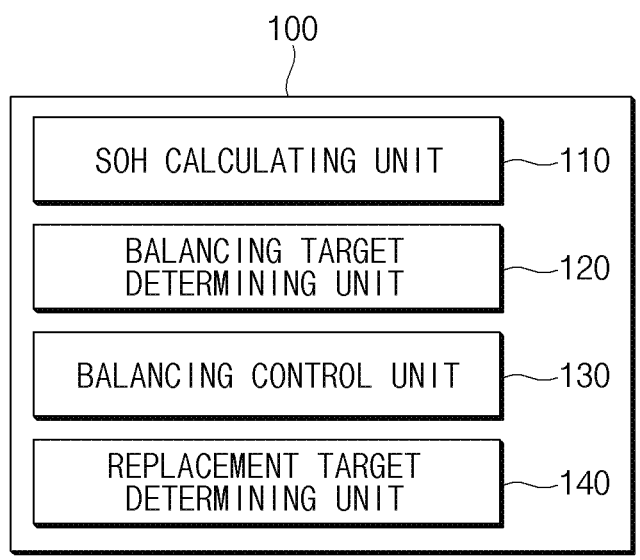
FIG. 2 is a block diagram illustrating a structure of a battery management apparatus, according to an embodiment of the present invention.

FIG. 2 is a block diagram illustrating a structure of a battery management apparatus, according to an embodiment of the present invention.

Referring to FIG. 2, the battery management apparatus 100 according to an embodiment of the present invention may include the SOH calculating unit 110, the balancing target determining unit 120, the balancing control unit 130, and the replacement target determining unit 140.

The SOH calculating unit 110 may calculate an SOH of each of a plurality of battery cells. For example, the SOH calculating unit 110 may calculate an SOH based on a state of charge (SOC) of each of the plurality of battery cells. In addition, the SOH calculating unit 110 may calculate the SOH based on various state values, such as a voltage, an internal resistance, and the number of times of charging and discharging of the battery.

The balancing target determining unit 120 may select a battery cell (a second battery cell) having an SOC difference from a battery cell (a first battery cell) having the lowest SOC from among the plurality of battery cells, the SOC difference being equal to or greater than a reference value, and determine a battery cell that is a balancing target by comparing the SOH of the first battery cell with the SOH of the second battery cell. For example, the reference value may be set based on specifications of a battery cell and a BMS that manages the battery cell.

More specifically, when the SOH of the first battery cell is greater than or equal to the SOH of the second battery cell, the balancing target determining unit 120 may determine the second battery cell as the balancing target. That is, the balancing target determining unit 120 may determine the second battery cell having an SOC difference from the first battery cell having the lowest SOC as a primary balancing target among the plurality of battery cells, the SOC difference being equal to or greater than the reference value, and finally determine the second battery cell as the balancing target when the SOH of the first battery cell is greater than or equal to the SOH of the second battery cell.

As such, the balancing target determining unit 120 may determine the balancing target when Equation 1 provided below is satisfied.

$$SOH_{Min\ Cell} - SOH_{Each\ Cell[n]} > 0 (n=\text{Battery cell } 1,2,3,\ldots,N),$$  [Equation 1]

where SOH Min Cell indicates an SOH value of the battery cell (the first battery cell) having the lowest SOC, and SOH Each Cell[n] indicates an SOH value of the battery cell (the second battery cell) having an SOC difference from the first battery cell, in which the SOC difference is greater than or equal to the reference value.

The balancing control unit 130 may perform balancing for the battery cell determined as the balancing target by the balancing target determining unit 120. For example, the balancing control unit 130 may perform balancing for a case where the SOC of the second battery cell is included in a preset section. In this case, the balancing control unit 130 may perform balancing based on one of a first section (e.g., an SOC upper-end section and a charging end state) in which the SOC of the second battery cell is equal to or greater than a first reference value or a second section (e.g., an SOC lower-end section and a discharging end state) in which the SOC of the battery cell is less than a second reference value that is less than the first reference value.

In this case, when balancing may be performed for both the first section and the second section, the balancing control unit 130 may preferentially perform balancing in the first section, that is, in which the SOC is at an upper end. This is because balancing based on the section in which the SOC of the battery cell is at the upper end may minimize the aging of the battery and prevent overcharging of the battery.

The replacement target determining unit 140 may determine a replacement target battery cell based on a SOC deviation among the plurality of battery cells in the other section than a section in which balancing for the battery cell is performed, between the first section and the second section. In this case, the replacement target determining unit 140 may determine, as the replacement target battery cell, a battery cell having an SOC deviation from any cell among the plurality of battery cells, the SOC deviation being equal to or greater than a reference value (e.g., 15%). For example, any cell among the plurality of battery cells may be any one cell among the plurality of battery cells.

The battery management apparatus 100 according to an embodiment of the present invention may prevent indiscriminate balancing as in the conventional art through this configuration. That is, in the battery management apparatus 100 according to an embodiment of the present invention, instead of allowing all battery cells to converge to any one point of the upper or lower end of the SOC, the maximum deviation is generated at the opposite point, thereby detecting a relatively fast aged battery cell through deviation diagnosis.

As such, with a battery management apparatus according to the present invention, when a balancing target for a battery cell is selected, whether to perform balancing is determined based on an aging degree of each battery cell, thereby efficiently performing balancing and safely managing a battery.

Figure 3:
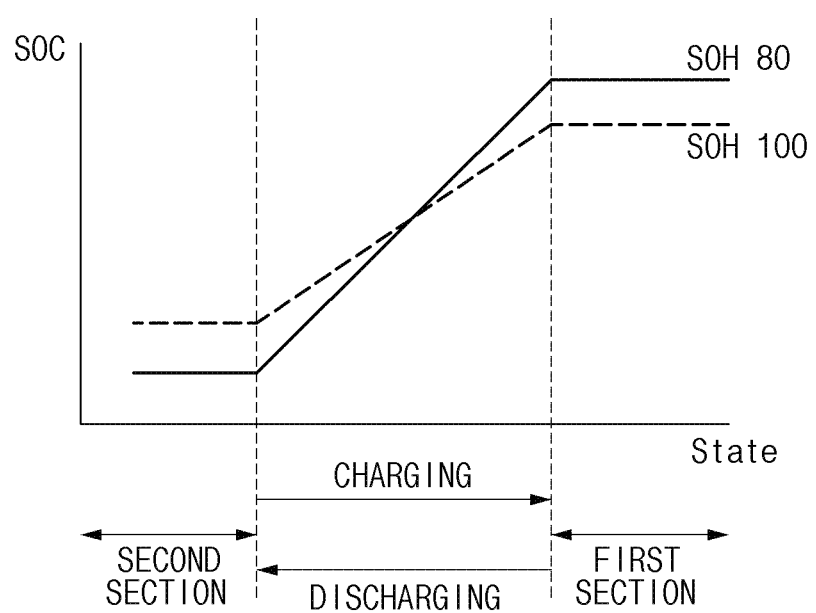
FIG. 3 is a view illustrating a state of charge (SOC) behavior in charging and discharging of a conventional battery cell.

FIG. 3 is a view illustrating a voltage behavior in charging and discharging of a conventional battery cell.

In a graph of FIG. 3, a horizontal axis represents a state of a battery cell, and a vertical axis represents an SOC. For example, when a battery cell is charged, it may be in a charging end state (the first section), and when the battery cell is discharged, it may be in a discharging end state (the second section). In another example, for serially connected battery cells with different SOHs, charging ends when charging of one battery cell is completed, and discharging ends when discharging of one battery cell is completed, such that they may have different SOCs when charging or discharging ends.

The SOH of the battery decreases at a rate at which the capacity of the battery decreases, such that an SOC change corresponding to charging or discharging appears gentler when the SOH of the battery is high than when the SOH of the battery is low. For example, when the SOH of the battery cell of 100 Ah becomes 50%, the battery cell eventually has a capacity of 50 Ah, which may mean that in charging and discharging with the same current as when the SOH is 100, a slope at which an SOC changes from 0% to 100% is doubled in comparison to the conventional art.

That is, as shown in FIG. 3, it may be seen that the slope in the case of SOH of 100 is gentler than that in the case of SOH of 80. In such a conventional battery cell, in the SOC upper-end section (e.g., the first section), a battery cell having an SOH of 80 is balanced based on a battery cell having an SOH of 100, whereas in the SOC lower-end section (e.g., the second section), a battery cell having the SOH of 100 is balanced based on a battery cell having the SOH of 80.

As such, conventionally, as balancing is performed without considering an SOH of each battery cell, battery cells performing balancing in the SOC upper-end section (the first section) or the SOC lower-end section (the second section) may be opposite to each other, failing to substantially obtain a balancing effect and causing aging to be accelerated over the entire battery module or pack due to discharging of the battery cells through balancing.

FIGS. 4 through 7 are views illustrating balancing performed by a battery management apparatus, according to an embodiment of the present invention.

In the graphs of FIGS. 4 to 7, like in the graph of FIG. 3, the horizontal axis indicates the state of the battery cell, and the vertical axis indicates the SOC. In addition, like in FIG. 3, in FIGS. 4 through 7, it may be seen that the slope becomes gentle as the SOH increases to 80, 90, and 100.

Figure 4:
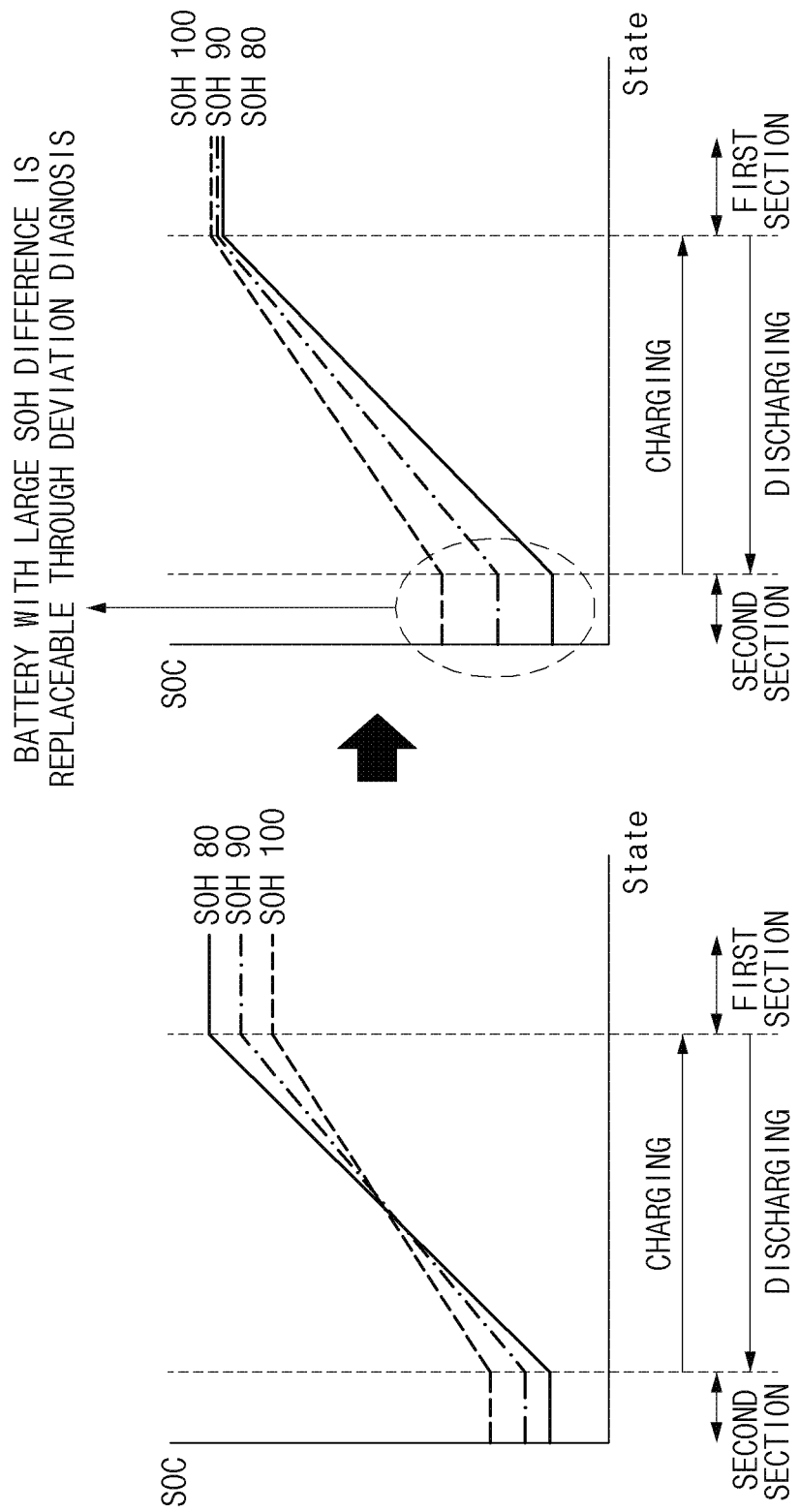
FIGS. 4 through 7 are views illustrating balancing performed by a battery management apparatus, according to an embodiment of the present invention.

First, referring to FIG. 4, in the section where the SOC is at the upper end (e.g., the first section and the charging end state), the SOC decreases in the SOH order of 80, 90, and 100, and in the section where the SOC is at the lower end (e.g., the second section and the discharging end state), the SOC decreases in the SOH order of 100, 90, and 80.

As shown in FIG. 4, in this case, with the battery management apparatus according to the present invention, it may be seen that in the SOC upper-end section (the first section) where the battery cell with the lowest SOC (i.e., the battery cell having an SOH of 100) has an SOH higher than that of the other battery cell, balancing is performed based on the battery cell with the SOH of 100.

Meanwhile, referring to FIG. 4, it may be seen that an SOC deviation between battery cells increases compared to before in the SOC lower-end section (the second section), through balancing in the SOC upper-end section (the first section). In this case, a battery with a large SOC difference between battery cells, i.e., a battery aged relatively badly may be replaced through deviation diagnosis for safe battery management.

Figure 5:
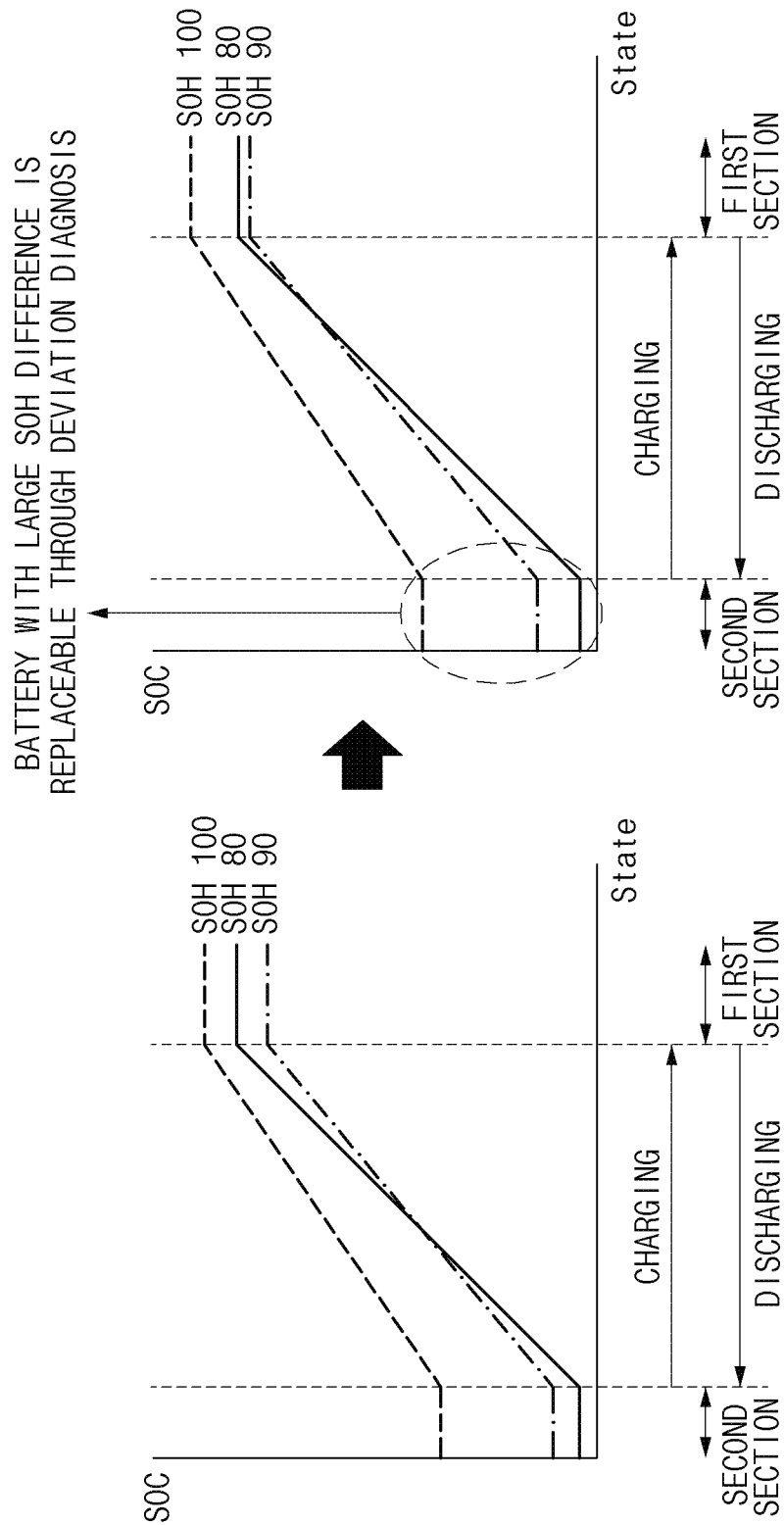

In addition, referring to FIG. 5, in the SOC upper-end section (the first section), the SOC decreases in the SOH order of 100, 80, and 90, and in the SOC lower-end section (e.g., the second section), the SOC decreases in the SOH order of 100, 90, and 80.

Also in this case, like in FIG. 4, in the SOC upper-end section (the first section), balancing may be performed for the battery cell with the SOH of 80 based on the battery cell with the SOH of 90 having the lowest SOC. Meanwhile, the battery cell with the SOH of 100 has an SOH higher than the battery cell with the SOH of 80 or 90, such that balancing is not performed.

On the other hand, referring to FIG. 5, it may be seen that an SOC deviation between battery cells increases compared to before in the SOC lower-end section (the second section), through balancing in the SOC upper-end section (the first section). In this case, like in FIG. 4, a battery with a large SOC difference between battery cells, i.e., a battery aged relatively badly may be replaced through deviation diagnosis for safe battery management.

Figure 6:
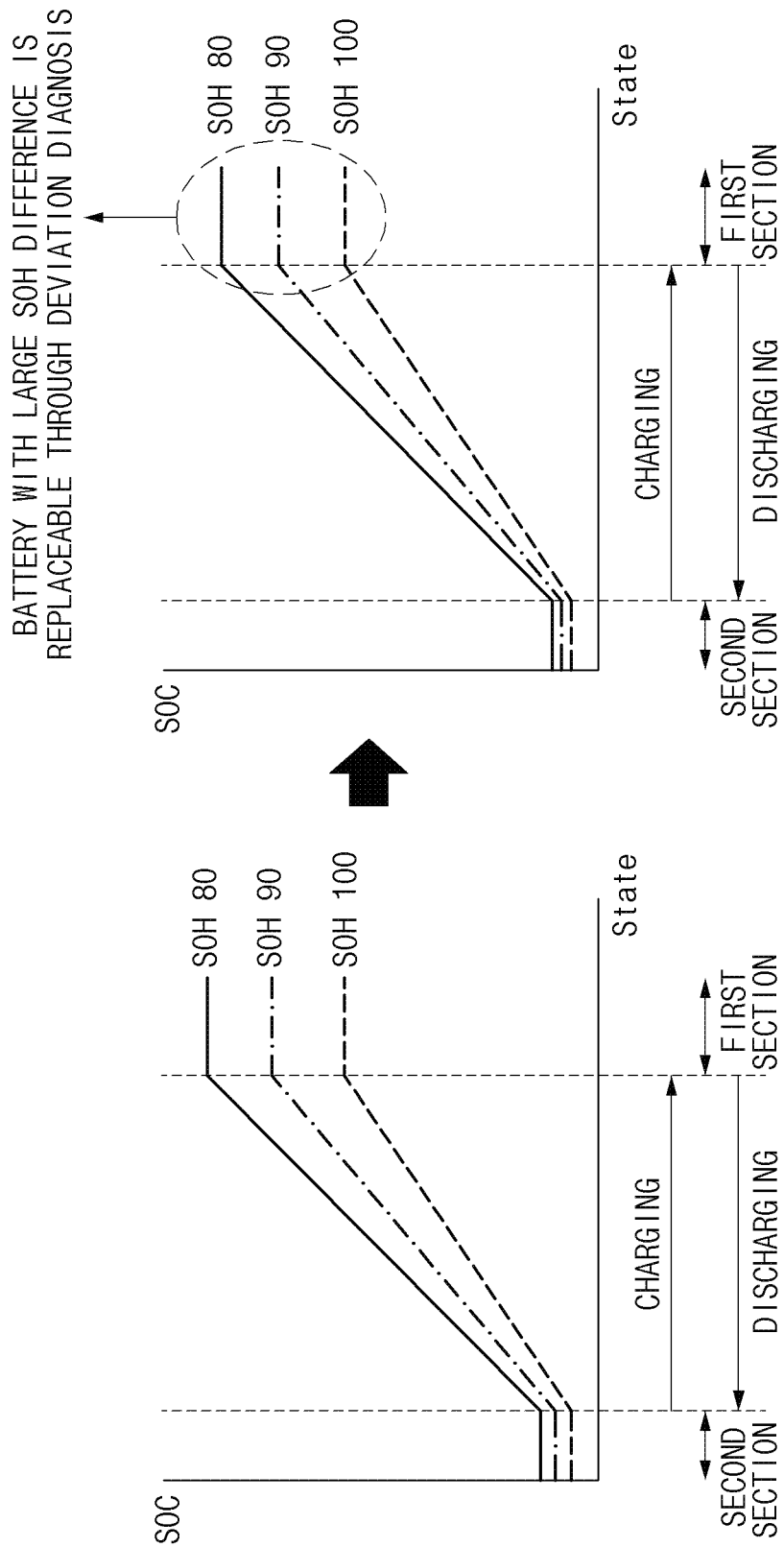

Referring to FIG. 6, both in the SOC upper-end section (the first section) and in the SOC lower-end section (e.g., the second section), the SOC decreases in the SOH order of 80, 90, and 100. In this case, with an operating scheme of a battery management apparatus according to the present invention, balancing may be performed based on the battery cell with the SOH of 100 both in the SOC upper-end section (the first section) and in the SOC lower-end section (e.g., the second section).

In this case, as shown in FIG. 6, balancing may be performed based on the SOC lower-end section (the second section) in which the SOC deviation among the battery cells with the SOHs of 80, 90, and 100 is relatively small. This is intended to perform deviation diagnosis based on the SOC upper-end section (the first section) because the SOC deviation between the battery cells appears large in the SOC upper-end section (the first section). As such, by performing deviation diagnosis for the SOC upper-end section (the first section), the battery cell with the large SOC difference due to occurrence of serious aging may be replaced.

Figure 7:
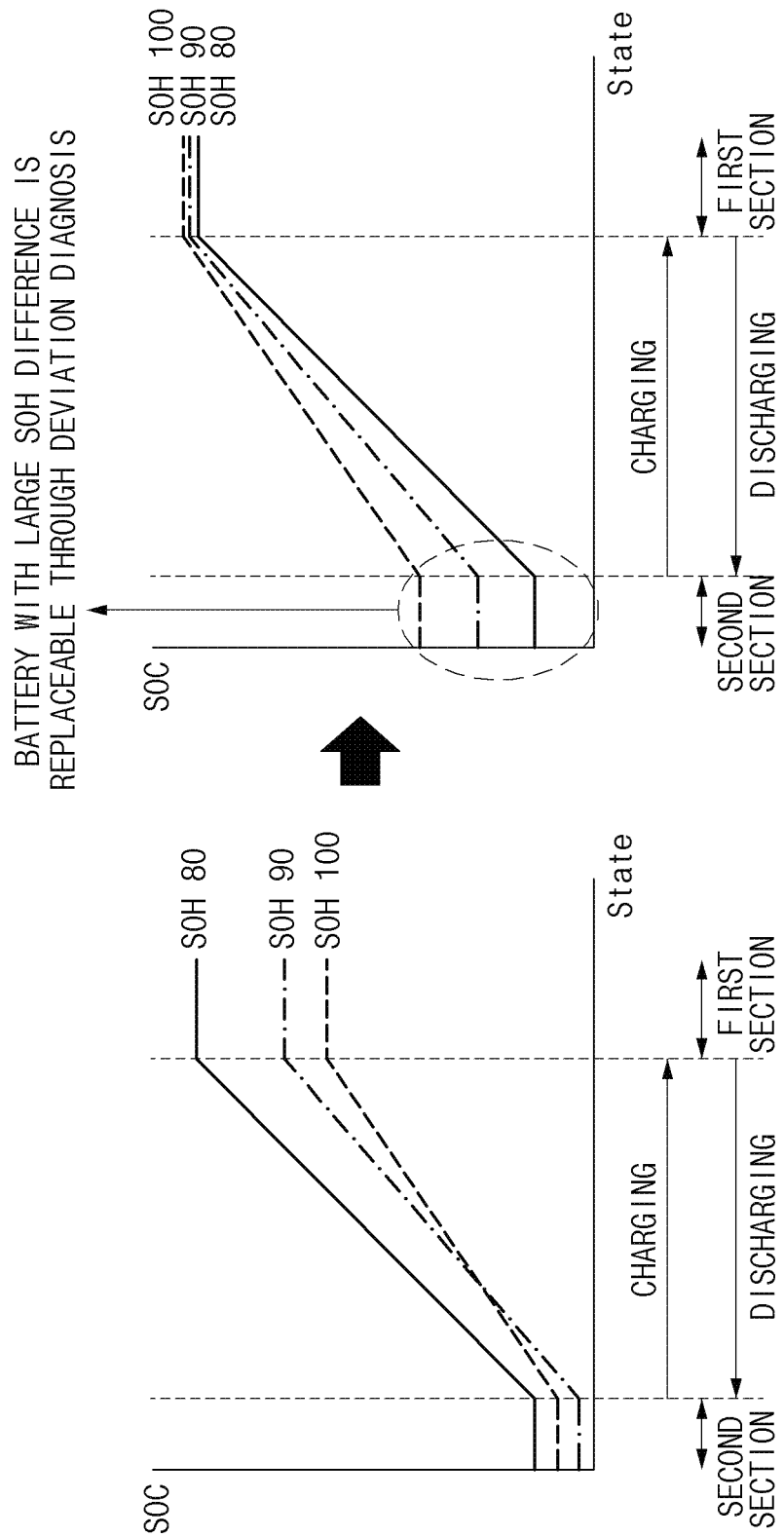

Moreover, referring to FIG. 7, in the SOC upper-end section (the first section), the SOC decreases in the SOH order of 80, 90, and 100, and in the SOC lower-end section (e.g., the second section), the SOC decreases in the SOH order of 80, 100, and 90.

Also in this case, like in the previous cases, in the SOC upper-end section (the first section), balancing may be performed for the battery cell with the SOH of 80 and the battery cell with the SOH of 90 based on the battery cell with the SOH of 100 having the lowest SOC. Meanwhile, in the SOC lower-end section (the second section), balancing may be performed for the battery cell with the SOH of 80 based on the battery cell with the SOH of 100.

In this case, as shown in FIG. 7, balancing may be performed based on the SOC upper-end section (the first section). This is because balancing based on the section (the first section) in which the SOC of the battery cell is at the upper end may minimize the aging of the battery and prevent overcharging of the battery. Moreover, by performing deviation diagnosis for the SOC lower-end section (the second section), the battery with the large SOC difference between the battery cells may be replaced.

The battery management apparatus 100 according to an embodiment disclosed in this document may determine a replacement target battery based on a result of deviation diagnosis based on an SOH difference between battery cells and the SOCs of the respective battery cells.

Figure 8:
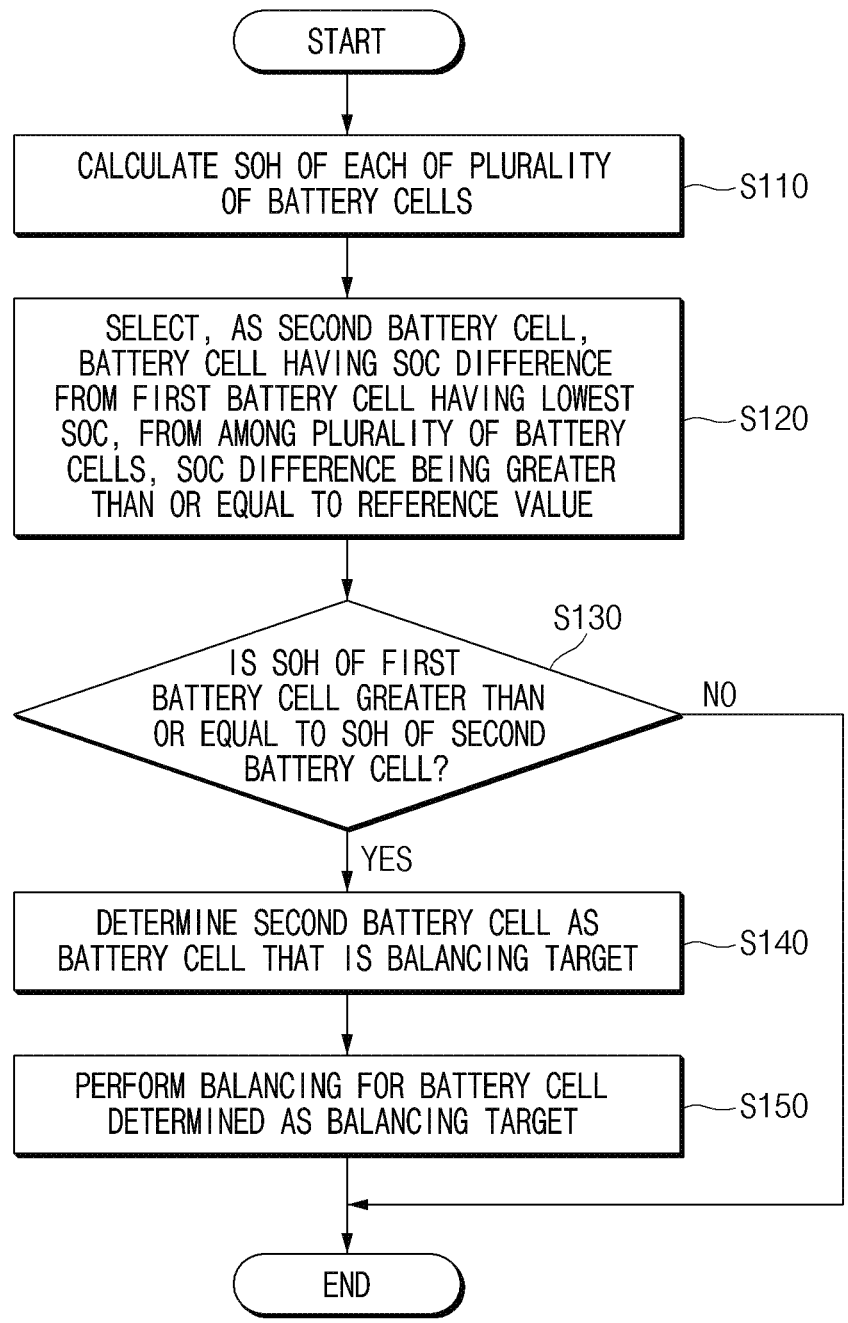
FIG. 8 is a flowchart illustrating a battery management method according to an embodiment of the present invention.

FIG. 8 is a flowchart illustrating a battery management method according to an embodiment of the present invention.

Referring to FIG. 8, a battery management method according to an embodiment of the present invention may calculate an SOH of each of a plurality of battery cells in operation S110. For example, in operation S110, the SOH may be calculated based on various state values, such as an SOC, a voltage, an internal resistance, and the number of times of charging and discharging of each of the plurality of battery cells.

Moreover, a battery cell with an SOC difference from a first battery cell with the lowest SOC, the SOC difference being greater than or equal to a reference value, may be selected as a second battery cell from among the plurality of battery cells, in operation S120. In this case, the reference value may be set based on specifications of a battery cell and a BMS that manages the battery cell.

It is determined whether the SOH of the first battery cell is greater than or equal to the SOH of the second battery cell, in operation S130. When the SOH of the first battery cell is less than the SOH of the second battery cell (NO), the second battery cell is excluded from the balancing target.

On the other hand, when the SOH of the first battery cell is greater than or equal to the SOH of the second battery cell (YES), the second battery cell is determined as the battery cell that is the balancing target, in operation S140. As such, in operations S120 through S140, the second battery cell in which an SOC difference from the first battery cell having the lowest SOC is equal to or greater than the reference value may be determined as a primary balancing target among the plurality of battery cells, and the second battery cell may be finally determined as the balancing target when the SOH of the first battery cell is greater than or equal to the SOH of the second battery cell.

Next, balancing may be performed for the battery cells determined as the balancing target, in operation S150. For example, in operation S150, balancing may be performed for a case where the SOC of the battery cell is included in a preset section. In this case, balancing may be performed based on one of the first section (e.g., the SOC upper-end section and the charging end state) in which the SOC of the second battery cell is equal to or greater than the first reference value and the second section (e.g., the SOC lower-end section and the discharging end state) in which the SOC of the battery cell is less than the first reference value.

When balancing may be performed for both the first section and the second section, balancing may be preferentially performed in the first section, that is, in which the SOC is at the upper end, in operation S150. This is because balancing based on the section in which the SOC of the battery cell is at the upper end may minimize the aging of the battery and prevent overcharging of the battery.

Meanwhile, although not shown in FIG. 8, the battery management method according to an embodiment of the present invention may further include determining a replacement target battery cell based on a SOC deviation among the plurality of battery cells in the other section than a section in which balancing for the battery cell is performed, between the first section and the second section. In this case, a battery cell having an SOC deviation from any cell among the plurality of battery cells, the SOC deviation being equal to or greater than a reference value (e.g., 15%), may be determined as the replacement target battery cell. For example, any cell among the plurality of battery cells may be any one cell among the plurality of battery cells.

As such, with the battery management method according to the present invention, when a balancing target for a battery cell is selected, whether to perform balancing is determined based on an aging degree of each battery cell, thereby efficiently performing balancing and safely managing a battery.

Figure 9:
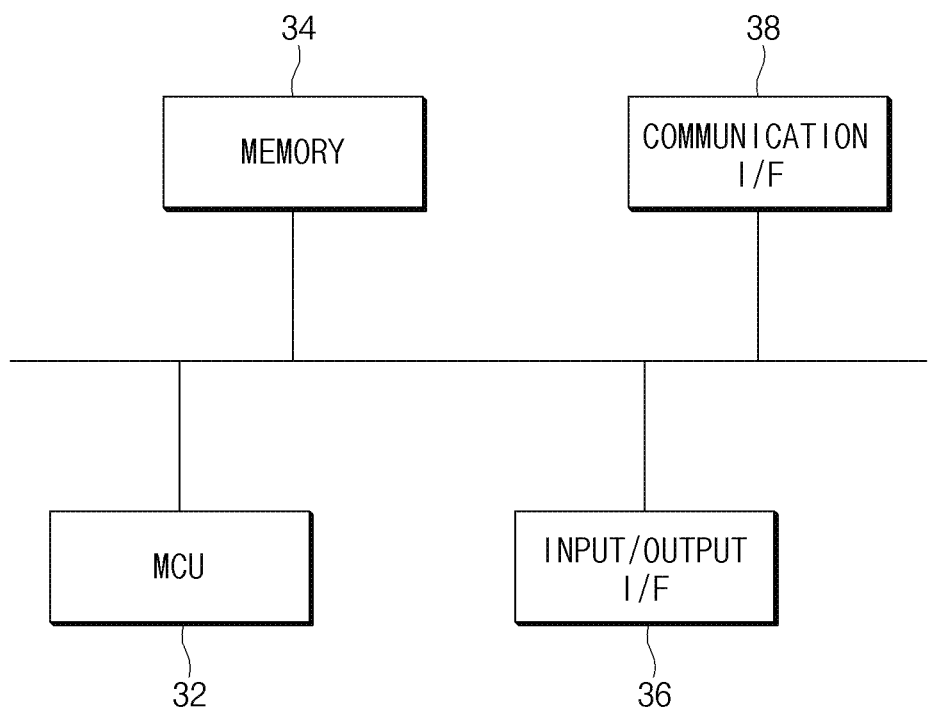
FIG. 9 is a block diagram illustrating a computing system that performs a battery management method according to an embodiment of the present invention.

FIG. 9 is a block diagram illustrating a computing system that performs a battery management method according to an embodiment of the present invention.

Referring to FIG. 9, a computing system 30 according to an embodiment of the present invention may include a microcontroller unit (MCU) 32, a memory 34, an input/output interface (I/F) 36, and a communication I/F 38.

The MCU 32 may be a processor that executes various programs (e.g., an SOH calculation program, a balancing target determination program, etc.) stored in the memory 34, processes various data including an SOC, an SOH, etc., of a battery cell through these programs, and executes the above-described functions of the battery management apparatus shown in FIG. 2.

The memory 34 may store various programs regarding SOH calculation of the battery cell, balancing target determination, etc. Moreover, the memory 720 may store various data such as SOC data, SOH data, etc., of each battery cell.

The memory 34 may be provided in plural, depending on a need. The memory 34 may be a volatile or nonvolatile memory. For the memory 34 as the volatile memory, random access memory (RAM), dynamic RAM (DRAM), static RAM (SRAM), etc., may be used. For the memory 34 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 34 are merely examples and are not limited thereto.

The input/output I/F 36 may provide an interface for transmitting and receiving data by connecting an input device (not shown) such as a keyboard, a mouse, a touch panel, etc., and an output device such as a display (not shown), etc., with the MCU 32.

The communication I/F 38, which is a component capable of transmitting and receiving various data to and from a server, may be various types of devices capable of supporting wired or wireless communication. For example, a program for SOH calculation of the battery cell or balancing target determination or various data, etc., may be transmitted and received to and from a separately provided external server through the communication I/F 38.

As such, a computer program according to an embodiment of the present invention may be recorded in the memory 34 and processed by the MCU 32, thus being implemented as a module that performs functions shown in FIG. 2.

Even though all components constituting an embodiment of the present invention have been described above as being combined into one or operating in combination, the present invention is not necessarily limited to the embodiment. That is, within the object scope of the present invention, all the components may operate by being selectively combined into one or more.

Moreover, terms such as "include," "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art unless defined otherwise. The terms used generally like terms defined in dictionaries should be interpreted as having meanings that are the same as the contextual meanings of the relevant technology and should not be interpreted as having ideal or excessively formal meanings unless they are clearly defined in the present invention.

The above description is merely illustrative of the technical idea of the present invention, and various modifications and variations will be possible without departing from the essential characteristics of the present invention by those of ordinary skill in the art to which the present invention pertains. Therefore, the embodiments disclosed in the present invention are intended for description rather than limitation of the technical spirit of the present disclosure and the scope of the technical spirit of the present invention is not limited by these embodiments. The protection scope of the present invention should be interpreted by the following claims, and all technical spirits within the same range should be understood to be included in the range of the present invention.

The invention claimed is:

1. A battery management apparatus, comprising:
a state of health (SOH) calculator configured to calculate a SOH of each of a plurality of battery cells based respectively on a state of charge (SOC), a voltage, an internal resistance, and a number of times of charging and discharging of a corresponding one of the battery cells;

a balancing target determiner configured to:
  select, as a second battery cell, a battery cell among the plurality of battery cells having an SOC difference from a first battery cell having a lowest SOC from among the plurality of battery cells, the SOC difference being greater than or equal to a reference value, and
  determine the second battery cell as a balancing target based on a comparison of a SOH of the first battery cell with a SOH of the second battery cell; and a balancing controller configured to perform balancing on the second battery cell, determined as the balancing target, in one of a first section in an SOC graph in which the SOC of the second battery cell is configured to be constant at an upper end and a second section of the SOC graph in which the SOC of the second battery cell is configured to be constant at a lower end that is lower than the upper end.

2. The battery management apparatus of claim 1, wherein the balancing target determiner is further configured to determine the second battery cell as the balancing target, only if the SOH of the first battery cell is greater than or equal to the SOH of the second battery cell.

3. The battery management apparatus of claim 2, wherein the balancing target determiner is further configured not to determine the second battery cell as the balancing target if the SOH of the first battery cell is less than the SOH of the second battery cell.

4. The battery management apparatus of claim 2, the balancing controller is:
  configured to perform balancing on the second battery if the second battery is determined as the balancing target; and
  not configured to perform balancing on the second battery cell if the SOH of the first battery cell is less than the SOH of the second battery cell.

5. The battery management apparatus of claim 1, further comprising a replacement target determiner configured to determine a replacement target battery cell based on an SOC deviation among the plurality of battery cells in one of the first section and the second section other than a section in which balancing for the battery cell is performed.

6. The battery management apparatus of claim 5, wherein the replacement target determiner is further configured to determine, as the replacement target battery cell, a battery cell having an SOC deviation from another cell among the plurality of battery cells, the SOC deviation being equal to or greater than a reference SOC deviation value.

7. The battery management apparatus of claim 1, wherein the balancing controller is further configured to preferentially perform the balancing for the first section, if balancing is possible both in the first section and in the second section.

8. The battery management apparatus of claim 1, wherein the reference value is set based on specifications of the plurality of battery cells and a battery management system (BMS) configured to control the plurality of battery cells, the BMS including the SOH calculator and the balancing target determiner.

9. The battery management apparatus of claim 1, wherein the first section and the second section are separated by a charging or discharging section in the SOC graph in which the SOC of the second battery cell is configured to vary between the upper end and the lower end.

10. A battery management method, comprising:
  calculating a state of health (SOH) of each of a plurality of battery cells based respectively on a state of charge (SOC), a voltage, an internal resistance, and a number of times of charging and discharging of a corresponding one of the battery cells;
  selecting, as a second battery cell, one of the plurality of battery cells with an SOC difference from a first battery cell with a lowest SOC among the plurality of battery cells, the SOC difference being greater than or equal to a reference value;
  determining the second battery cell as a balancing target based on a comparison of an SOH of the first battery cell with an SOH of the second battery cell; and
  performing balancing on the second battery cell determined as the balancing target, in one of a first section in an SOC graph in which the SOC of the second battery cell is configured to be constant at an upper end and a second section of the SOC graph in which the SOC of the second battery cell is configured to be constant at a lower end that is lower than the upper end.

11. The battery management method of claim 10, wherein the determining of the balancing target comprises determining the second battery cell as the balancing target, only if the SOH of the first battery cell is greater than or equal to the SOH of the second battery cell.

12. The battery management method of claim 11, wherein the determining of the balancing target further comprises not determining the second battery cell as the balancing target if the SOH of the first battery cell is less than the SOH of the second battery cell.

13. The battery management method of claim 11, wherein the performing balancing includes:
  performing balancing on the second battery if the second battery is determined as the balancing target; and
  not performing balancing on the second battery cell if the SOH of the first battery cell is less than the SOH of the second battery cell.

14. The battery management method of claim 10, wherein the first section and the second section are separated by a charging or discharging section in the SOC graph in which the SOC of the second battery cell is configured to vary between the upper end and the lower end.

* * * * *